United States Patent [19]

Sood

[11] Patent Number: 5,033,101

[45] Date of Patent: Jul. 16, 1991

[54] METHOD FOR CHARACTER-AND/OR-OBJECT RECOGNITION

[76] Inventor: Ralf-A. Sood, Alte Aue 37, D-3016, Seelze 2, Fed. Rep. of Germany

[21] Appl. No.: 208,217

[22] Filed: Jun. 17, 1988

[30] Foreign Application Priority Data

Jun. 20, 1987 [DE] Fed. Rep. of Germany ....... 3702489

[51] Int. Cl.$^5$ .............................................. G06K 9/62
[52] U.S. Cl. ........................................ 382/30; 382/33; 382/38; 382/42
[58] Field of Search ..................... 382/30, 33, 34, 9, 10, 382/8, 42, 38, 25

[56] References Cited

U.S. PATENT DOCUMENTS

| | | | |
|---|---|---|---|
| 3,713,100 | 1/1973 | Hemtreet | 382/30 |
| 3,846,752 | 11/1974 | Nakano et al. | 382/30 |
| 4,581,762 | 4/1956 | Lapidus et al. | 382/30 |
| 4,736,437 | 4/1988 | Sacks et al. | 382/30 |
| 4,794,646 | 12/1988 | Takeuchi et al. | 382/30 |
| 4,805,224 | 2/1984 | Koezuka et al. | 382/30 |

*Primary Examiner*—David K. Moore
*Assistant Examiner*—Joseph Mancuso
*Attorney, Agent, or Firm*—Shlesinger, Arkwright & Garvey

[57] ABSTRACT

Unknown characters and objects are read opto-electronically and the read signals are digitized to generate a binary image of the characters and objects, said image being compared with binary reference images of known reference characters and reference objects stored in reference memories, the reference raster image(s) with the highest coincidence with the read characters or objects being selected to identify the read-in characters or objects. The stored binary reference images form a first binary comparison plane. At least one more binary comparison plane is provided, which consists of stored reference raster images generated by the binary imaging of characteristics or of characteristics parts of the known characters and objects. The actual character or object image read-in in binary manner is compared with at least one reference raster image of a further comparison plane for coincidence if the comparison with the reference raster image of the first comparison plane, or of the first comparison plane combined with a further comparison plane, results in a degree of coincidence below a predetermined threshold.

14 Claims, 2 Drawing Sheets

I SCANNING

II WRITING INTO TABLE

| LEFT VALUE | RIGHT VALUE |
|---|---|
| 1 | 2 |
| 1 | 2 |
| 1 | 2 |
| 1 | 2 |
| 1 | 2 |
| 1 | 2 |
| 1 | 3 |
| 1 | 2 |
| 1 | 6 |
| 1 | 6 |

III COPYING IN TARGET ZONE

IV ERASING

METHOD FOR CHARACTER-AND/OR-OBJECT RECOGNITION

The invention concerns a method for character- and/or object recognition.

A number of procedures and devices are known to read texts. An optical scanner reads the text line by line and resolves it into image points which, resolved into pixels (picture elements) are transmitted to the semiconductor components. In these semiconductor components, the read characters now resolved into dot-pattern images are compared with reference characters, comparison and classification algorithms being used to determine the degree of coincidence. There are a large number of interferences degrading character recognition. Illustratively there may be variations in the thickness and cleanliness of a printed paper. Further, fibers and impurities distort the characters by cracks and bosses. In thin paper, the printing on the back provides spuriousness during scanning or merely interferes. As regards mechanical printing, for instance in lead composition, the characters sometimes are deformed. Each mechanical damage to the printing block is reproduced in the form of cracks and bosses. Thereby the characters to be recognized assume many shapes. Moreover the viscosity of the printing ink is significant. Thin ink will run, whereas thick ink causes rough outside edges and holes. Even the scanners may introduce errors. Scanners with a short contrast range cause sharp jumps in contrast, resulting in coarse signal rendition. The same applies to low resolution. Also, dots may be lost or added sporadically during scanning. Reverse-side prints may cause changes in characters. Lastly the character position may interfere in the dot imaging of the raster if there is rotation or obliqueness.

The object of the present invention is to create a method for character-and/or-object recognition operating at higher accuracy and capable of processing arbitrary characters and objects—even low printing or reproduction grade—further characters and objects changed by external factors.

This problem is solved by the method in the present invention.

The method of the invention provides for at least one binary reference raster image plane stored in reference memories. The first binary plane contains reference raster images of reference characters or objects, whereas the memories for the second and further binary planes comprise reference raster images which are weighted in particular manner regarding the features or characteristic parts of the characters or objects. An actual character or object read opto-electronically and to be identified is first digitized and stored in binary form in a memory and then is compared with the known stored reference characters or objects. If there is failure to achieve a predetermined degree of coincidence adequate for identification, then a comparison will be carried out between the reference character or object showing the greatest coincidence with the read character or object and the next-best character or object in the second binary comparison plane relative to the features or characterizing parts of the reference character or object associated with that plane. The correlation value so ascertained is combined with the first comparison result (correlation value.) If the degree of coincidence still is inadequate for identification, further comparisons are performed until the read character or object is identified. On account of these similarity ratings carried out additionally to the similarity ratings of the total character regarding features or characterizing parts, it will be feasible to recognize with high accuracy even arbitrarily shaped characters, especially those which are not standardized.

Advantageous and appropriate further developments of the solution of the invention are stated hereinbelow.

Character-and-object recognition can be made more reliable yet if a predetermined distance to the nearest or to the next-best and/or second-best reference character or reference object is exceeded.

In order to avoid unnecessary comparison operations, the comparison with the reference raster images is terminated if a predetermined degree of coincidence is reached whereby the particular read character or object has been recognized. Thereby the processing time may be minimized.

In order to further minimize the processing time and in particular the danger of confusion, the height and width of the read character of object imaged in binary manner is determined before testing the degree of coincidence, and compared with the binary reference raster image, the testing being carried out only with those reference raster images for which the coincidence result shall be within a predetermined tolerance range.

Further minimization of confusion is feasible if the particular smallest area as determined by width and height of the compared read and reference characters or objects determines the rating surface.

In order to reliably segregate or isolate the individual characters in character recognition, for instance for kerned scripts, where the characters may be kerned (for instance when using slanted letters), so that no other character be erroneously scanned at the same time, the read characters or objects imaged in binary form are first segmented (isolated) from the total raster image by scanning pixel-wise the outer contour of each character or object, entering the scanning results into a table of which the number of lines depends on the height of the characters or objects, and copying the characters or objects according to the tabulated values into a one-dimensional or two-dimensional target zone for further processing of character recognition. Advantageously, the read and imaged character or object shall be erased after copying.

In order to scan rapidly and unambiguously the outer contour, the scanning is carried out from an outer contour pixel only in one direction, either left or right rotary.

The characters recognized by the method of the invention are converted for further processing into character codings, for instance, ASCII, EBCDIC etc.

The invention is discussed in further detail below in relation to the attached drawings.

Figure 1:
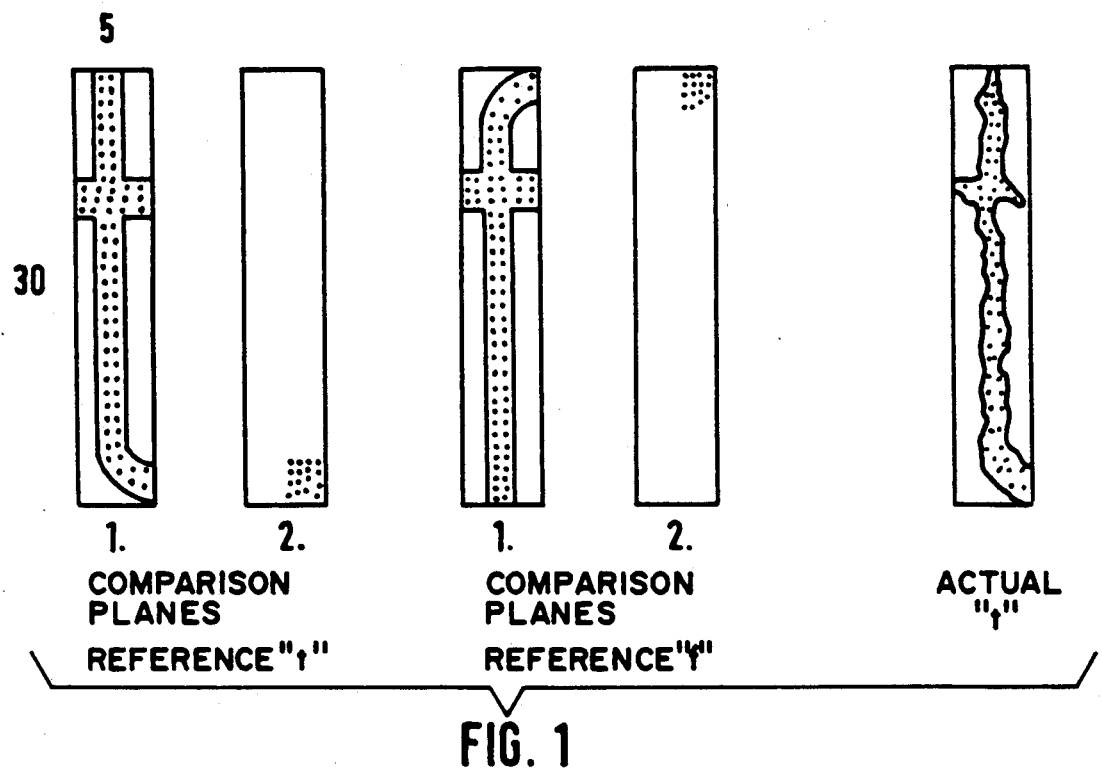
FIG. 1 is a schematic view of an actual character and of two reference characters closest to this actual character for purposes of comparison in a first and second plane.

Be it assumed that according to the drawing, an unknown actual "t" shall be recognized. The comparison of reference-to-actual characters between the unknown actual t and the stored reference characters may show equal degrees of coincidence of the first comparison plane relating to the reference t and to the reference f. The reference t and the reference f also are shown in the attached drawing. This drawing furthermore shows one binary reference picture each of a characteristic character part of t and f, namely the foot of the t and the head of the f, for a further comparison plane.

Be it assumed that the analyzed areas of the reference characters are 150 dots or pixels (height-30 pixels, width=5 pixels). The rating area of the characteristic character parts shall be designated herein as the weighting area and shall in this case amount to about 10% of the rating area of the reference character and therefore shall have a value of 15 (15 pixels).

The degree of coincidence, i.e. the threshold value for identifying the character, is assumed to be 85%, corresponding to a deviation of 15%. Moreover a distance amounting to 50% of the deviation, i.e. 7.5% is provided for identification.

It is further assumed that the comparison carried out in the first binary comparison plane between the actual t and the reference t failed to provide adequate degree of coincidence for identification, that is, the threshold of 85% was not exceeded. It is assumed again that the analysis of the second-best reference character, here the character f, resulted in the same cross-correlation value as for the reference t. Illustratively let there have been counted 127 coinciding pixels, whereby the correlation value is 127/150=84.6%. Because the comparison in the first binary comparison plane, i.e. the bit plane, did not lead to identifying the actual Character, presently the degree of coincidence in the second binary comparison plane shall be ascertained for the reference characters t and f. It is assumed that the investigation showed that as regards the reference t, 14 of 15 possible pixels coincide with the actual t, but for the reference f only one dot of a maximum of 15 pixels.

This comparison therefore provides the following cross-correlation values:

for t:

$$\frac{127 \text{ (first plane)} + 14 \text{ (second plane)}}{150 \text{ (analyzed plane)} + 15 \text{ (weighting area)}} = 141/165 = 85.45\%$$

for f:

$$\frac{127 \text{ (first plane)} + 1 \text{ (second plane)}}{150 \text{ (analyzed area)} + 15 \text{ (weighting area)}} = 128/165 = 77.58\%$$

Accordingly the above defined threshold is exceeded by this second comparison in the second comparison plane or second bit plane, whereby the character to be identified was properly recognized as a "t".

In the light of the above definition, the distance is the difference between the two cross-correlation values. It is 7.87%. Thereby the recognized "t" is adequately different from the reference f, i.e., the distance to the second-best "f" is observed.

Thereby all the conditions for identification were satisfied.

Frequently so-called kerned scripts or scripts with slanted letters are used, where characters are kerned, so that there is danger illustratively of not separating two letter in the recognition. Moreover spots and the like may be present next to the characters, whereby recognition of the character itself will be made more difficult.

In order to make possible in such cases problem-free recognition of the individual characters in a series of characters, for instance a word, the read characters reproduced in binary form first shall be segmented (isolated) from the total raster picture, that is, in a manner of speaking, individualized.

Figure 2:
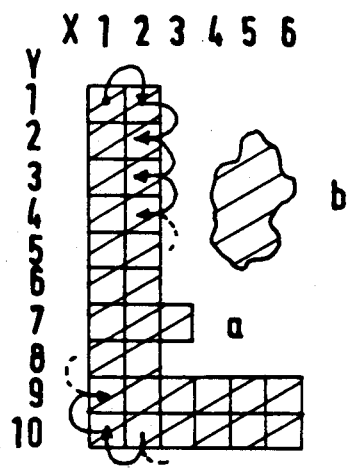
FIG. 2 shows schematically the segmentation of an actual read character imaged in binary manner.
Figure 2:
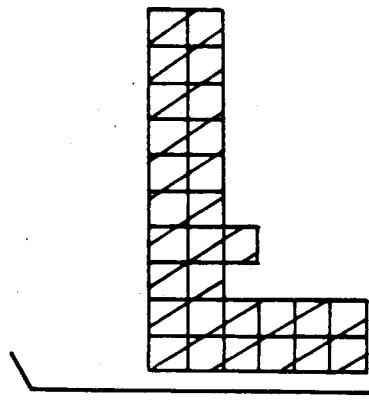
Figure 2:
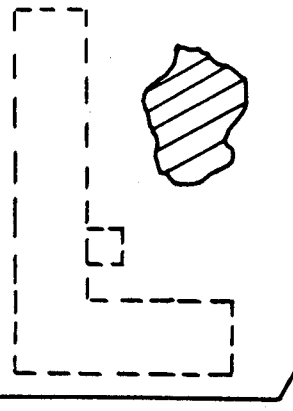

FIG. 2 schematically shows this segmentation procedure. Basically it includes three steps:

I. Pixel-wise scanning of the outer contour of the read actual character reproduced in binary form (in this case an L with a defect site a and a spot b) to ascertain the outer contour, II. recording the scan results in a table, and III. copying the actual character in a target zone in accordance with the table values.

Additionally, the read character reproduced in binary form can be erased in a fourth step IV after copying.

The outer contour is determined sequentially by scanning the adjacent pixels, which may be up to 8, of each outer-contour pixel. Thereby the defect site a, however not the spot b, will be recorded also.

The left and right values of the x-axis (character widths) are entered into the table over the height (here divided into ten lines), that is the y-axis, of the characters, the right value stating the length of the character bar and the left value stating the left-side beginning of this character bar.

Segmentation therefore allows isolating the individual characters of a character structure and eliminating spots, for instance ink sprays, so that the character recognition shall not be degraded.

Figure 3:
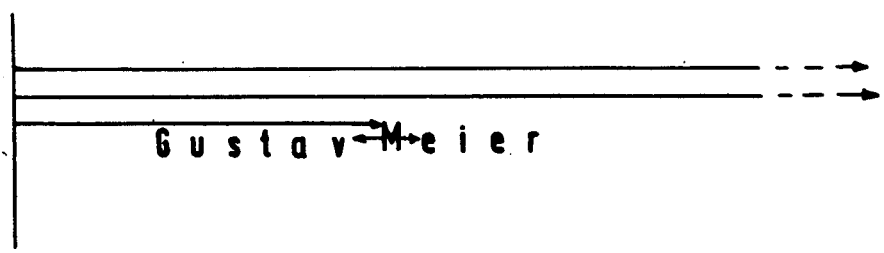
FIG. 3 is a schematic view of scanning when linewise scanning up to the first contact with a character.

When scanning the binary image, the scanning lasts until the first contact with a character when the scanning is linewise. This is shown schematically in FIG. 3. The scanning takes place over the entire width of the x-axis until contact is made with the highest rising character or object; in this regard reference is made to the scanning arrows above the "Gustav Meier" script. This character is then fed to processing. Upon recognition, characters on the left and/or on the right of the first recognized character or object will then be processed.

I claim:

1. A method for recognizing objects, comprising the steps of:
   (a) opto-electronically reading the objects;
   (b) digitizing the read signals to generate a binary image of the objects;
   (c) comparing the objects with a first binary comparison plane formed of known stored reference raster images of objects;
   (d) determining a first correlation value and comparing with a predetermined threshold value;
   (e) selecting the reference raster images where the first correlation value exceeds the threshold value to identify the read actual objects;
   (f) if the correlation value in step (d) is below the threshold value, comparing the read objects with a second binary comparison plane formed of stored reference raster images of characteristic parts of the reference objects;
   (g) determining a second correlation value and combining with the first correlation value and comparing the resulting combined correlation value with the predetermined threshold value;
   (h) selecting the reference raster images where the combined correlation value exceeds the threshold value to identify the read actual objects;
   (i) if the combined correlation value in step (g) is below the threshold value, comparing the read objects with at least one further binary comparison plane formed of stored reference raster images of other characteristic parts of the reference objects;

(j) determining at least one further correlation value and combining with the first and second correlation values and comparing the resulting combined correlation value with the predetermined threshold value; and (k) selecting the reference raster images where the combined correlation value from step (j) exceeds the threshold value to identify the read actual objects.

2. A method as in claim 1, and including the step of:
(a) associating the binary images of the features of the known reference objects with weighting areas of predetermined bit numbers.

3. A method as in claim 1, and including the step of:
(a) selecting between 55% and 100% degree of coincidence as the predetermined threshold value for identification.

4. A method as in claim 3, and including the steps of:
(a) comparing with at least one next-best reference objects and determining a correlation value;
(b) determining the difference between the first correlation value from the next-best correlation value; and
(c) comparing the difference with a predetermined minimum value.

5. A method as in claim 4, and including the step of:
(a) choosing a value between 30% and 100% of the deviation from identity as the predetermined minimum value.

6. A method as in claim 1, and including the step of:
(a) comparing pixel-wise the reference objects reproduced in pixels and the read objects imaged in pixels for coincidence; and
(b) counting the number of coincidences or deviations from the comparison results.

7. A method as in claim 1, and including the step of:
(a) terminating the comparison with the reference raster images when the predetermined degree of coincidence has been reached.

8. A method as in claim 1, and including the steps of:
(a) prior to testing for the degree of coincidence, determining the height and the width of the read actual object imaged in binary manner and comparing with the height and the width of the binary reference raster images; and
(b) proceeding with the testing with those reference raster images for which the comparison lies within a predetermined range of tolerances.

9. A method as in claim 8, and including the step of:
(a) choosing the least area determined by the height and width of the mutually compared actual objects and reference objects as the weighting area.

10. A method as in claim 8, and including the step of:
(a) choosing the largest area determined by the height and width of the mutually compared actual objects and reference objects as the weighting area.

11. A method as in claim 10, and including the steps of:
(a) scanning pixel-wise the outer contour of each object;
(b) entering the scanning results into a table having a number of lines depending on the height of the objects; and
(c) copying the objects according to the tabulated values into a target zone for further processing for recognition.

12. A method as in claim 11, and including the step of:
(a) erasing the read objects imaged in binary form according to the tabulated values after copying.

13. A method as in claim 11, and including the step of:
(a) scanning the outer contour pixel only in one direction of right-rotary or left-rotary.

14. A method as in claim 11, and including the steps of:
(a) processing first the highest projecting object that is first contacted during scanning of the binary image over the entire width of the x-axis; and
(b) processing the objects to the left or right of the first processed object.

* * * * *